US012634030B2

(12) United States Patent
Srivastava et al.

(10) Patent No.: US 12,634,030 B2
(45) Date of Patent: May 19, 2026

(54) SYSTEM AND METHOD FOR SELECTING PTP SOURCES IN A NETWORK WITH IWF ASSISTED BOUNDARY CLOCKS

(71) Applicant: CIENA CORPORATION, Hanover, MD (US)

(72) Inventors: Sharad Kumar Srivastava, Benares (IN); Vineet Kumar Garg, Gurgaon (IN); Krishan Singh, Haryana (IN); Vikas Joshi, Karnataka (IN)

(73) Assignee: CIENA CORPORATION, Hanover, MD (US)

( * ) Notice: Subject to any disclaimer, the term of this patent is extended or adjusted under 35 U.S.C. 154(b) by 315 days.

(21) Appl. No.: 18/416,509

(22) Filed: Jan. 18, 2024

(65) Prior Publication Data

US 2025/0184023 A1     Jun. 5, 2025

(30) Foreign Application Priority Data

Nov. 30, 2023     (IN) .............................. 202311081251

(51) Int. Cl.
*H04L 45/50*          (2022.01)
*H04J 3/06*           (2006.01)
(52) U.S. Cl.
CPC .......... *H04J 3/0667* (2013.01); *H04J 3/0641* (2013.01); *H04L 45/50* (2013.01)
(58) Field of Classification Search
None
See application file for complete search history.

(56) References Cited

U.S. PATENT DOCUMENTS

| | | | | |
|---|---|---|---|---|
| 2021/0328696 | A1* | 10/2021 | Lv | H04J 3/0679 |
| 2022/0209882 | A1* | 6/2022 | Peng | H04J 3/0629 |
| 2023/0103012 | A1* | 3/2023 | Zinner | H04J 3/0644 |
| | | | | 370/503 |
| 2023/0134036 | A1* | 5/2023 | Larsson | H04W 56/0055 |
| | | | | 370/350 |
| 2025/0105997 | A1* | 3/2025 | Swaminathan | H04L 7/0008 |
| 2025/0307691 | A1* | 10/2025 | Estabrooks | H04J 3/0644 |
| 2025/0343614 | A1* | 11/2025 | Peng | H04J 3/0641 |

OTHER PUBLICATIONS

"G.8275 Amendment 2 Latest Draft; WD825", ITU-T Draft; Study Period 2021-2024; Study Group 15; Series WD825, International Telecommunication Union, Geneva; CH, Oct. 19, 2021, 53 pgs.
"PCT/US2024/056906 International Search Report and Written Opinion", mailed Feb. 21, 2025, Feb. 21, 2025, 10 pgs.
Duraiappah , et al., "How IEEE 1588 synchronizes 5G Open RAN", Skyworks, Apr. 6, 2023, 15 pgs.

* cited by examiner

*Primary Examiner* — Anh Vu H Ly
(74) *Attorney, Agent, or Firm* — Guntin & Gust, PLC; Kenneth S. Kwan

(57)          ABSTRACT

Aspects of the subject disclosure may include, for example, a device, including: a processing system including a processor; and a memory that stores executable instructions that, when executed by the processing system, facilitate performance of operations of: receiving an indication of a priority level of an interworking function used by a boundary clock node; and selecting a best master clock using an algorithm that considers the priority level of the boundary clock node. Other embodiments are disclosed.

20 Claims, 5 Drawing Sheets

100

110

| Input Profile (e.g. T-BC-2) | Bit 'm' (FTS to PTS) | Bit 'n' (PTS to FTS) | Network | IWF Priority |
|---|---|---|---|---|
| G.8275.1 | 0 | 0 | Fully FTS network – No IWF profile translation involved | 1 |
| G.8275.1 | 0 | 1 | FTS recovered from PTS | 2 |
| G.8275.1 | 1 | 1 | Two IWFs (FTS to PTS and then PTS to FTS again) | 3 |

SYSTEM AND METHOD FOR SELECTING PTP SOURCES IN A NETWORK WITH IWF ASSISTED BOUNDARY CLOCKS

CROSS-REFERENCE TO RELATED APPLICATION(S)

This application claims priority under 35 U.S.C. § 1.119 to Indian patent application no. 202311081251, filed on Nov. 30, 2023. All sections of the aforementioned application(s) and/or patent(s) are incorporated by reference herein in their entirety.

FIELD OF THE DISCLOSURE

The subject disclosure relates to a system and method for selecting precision timing protocol (PTP) sources in a network with assisted boundary clocks using interworking function (IWF) to translate between different PTP profiles.

BACKGROUND

IEEE-1588 precision timing protocol (PTP) (or associated ITU-T telecommunications standards, i.e., G.8275.2, G.8275.1, for phase recovery in Internet Protocol (IP) networks) has become critical to deliver synchronization of radios in modern cellular networks, such as fifth generation (5G) networks, which are heavily reliant on highly accurate phase and time being available. PTP can be carried either over an IP/multi-protocol label switching (MPLS) network as partial timing support (PTS) as per G.8275.2 or over an Ethernet network as a full timing support (FTS) as per G.8275.1 between a PTP grandmaster (GM) clock and a PTP client. These are described in more detail in ITU-T G.8275. A PTP client uses timestamps received through PTP protocol to recover accurate time and phase for alignment to the PTP GM clock. This process may be assisted by recovered frequency from electrical sources like synchronous Ethernet (SyncE), building integrated timing supply (BITS), etc.

BRIEF DESCRIPTION OF THE DRAWINGS

Reference will now be made to the accompanying drawings, which are not necessarily drawn to scale, and wherein:

FIG. 2 is a block diagram illustrating an exemplary, non-limiting embodiment of a table for providing precision time protocol node information in a network in accordance with various aspects described herein.

DETAILED DESCRIPTION

Figure 1A:
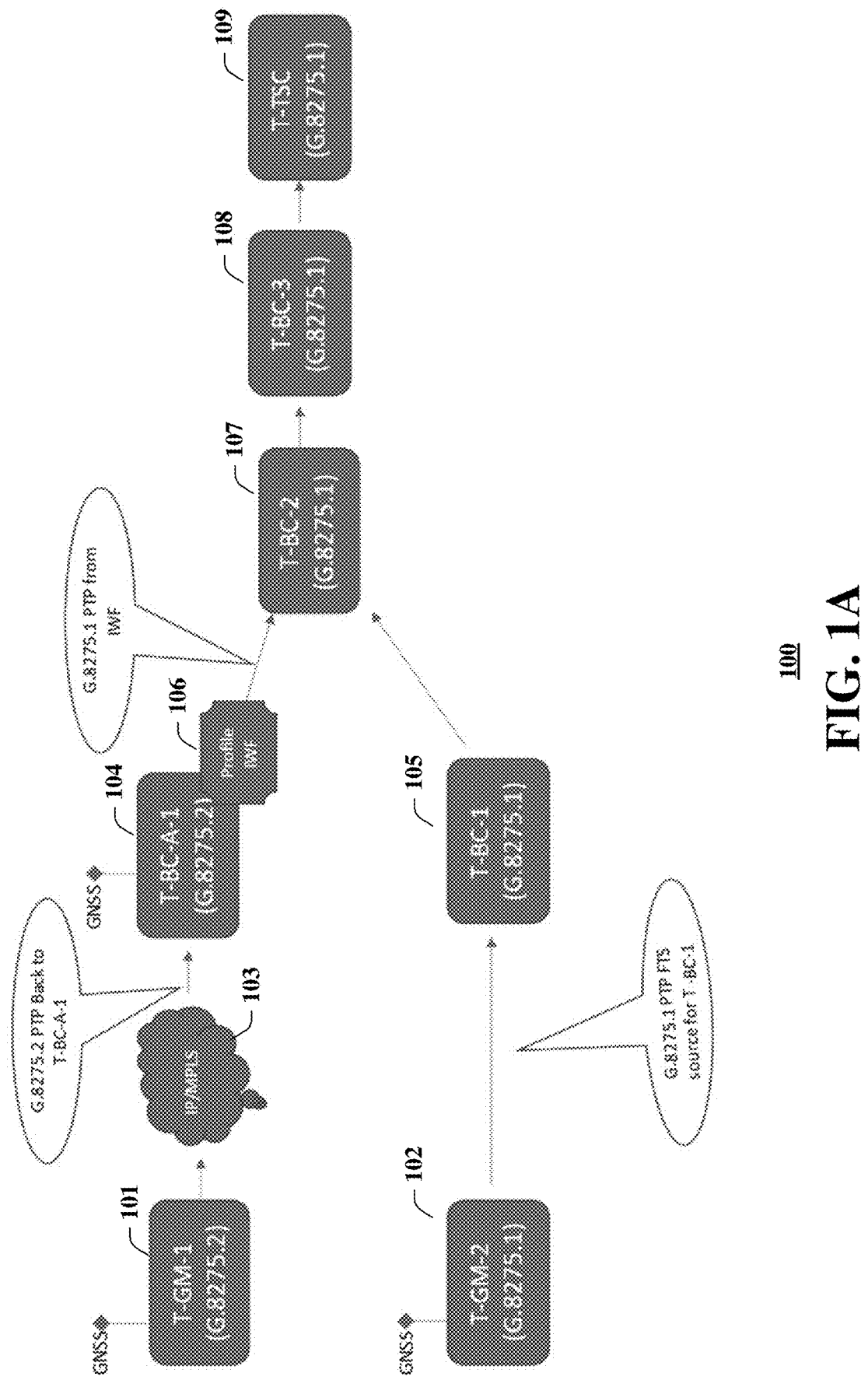
FIG. 1A is a block diagram illustrating an exemplary, non-limiting embodiment of precision time protocol nodes in a network in accordance with various aspects described herein.

The subject disclosure describes, among other things, illustrative embodiments for selecting PTP sources in a network with IWF-based assisted boundary clocks. Other embodiments are described in the subject disclosure.

One or more aspects of the subject disclosure include a device, including: a processing system including a processor; and a memory that stores executable instructions that, when executed by the processing system, facilitate performance of operations of: receiving an indication of a priority level of an interworking function used by a boundary clock node; and selecting a best master clock using an algorithm that considers the priority level of the boundary clock node.

One or more aspects of the subject disclosure include a device having: a processing system including a processor; a global navigation satellite system receiver; a clock; and a memory that stores executable instructions that, when executed by the processing system, facilitate performance of operations, including: receiving first timing information from the global navigation satellite system receiver; receiving second timing information via partial timing support over an Internet Protocol network; and providing an indication of a priority level of an interworking function in an announce packet of precision timing protocol to a downstream node.

One or more aspects of the subject disclosure include a non-transitory, machine-readable medium with executable instructions that, when executed by a processing system including a processor, facilitate performance of operations of: receiving first timing information from a global navigation satellite system receiver; receiving second timing information via partial timing support over a network; and providing an indication of a priority level of an interworking function in an announce packet of precision timing protocol to a downstream node.

In some network deployment scenarios, PTP backs up another time source, like a Global Navigation Satellite System (GNSS), as a measure of providing resilience to a network timing architecture. This architecture is described by ITU-T in G.8275.1 and G.8275.2 recommendations and is referred to as Assisted-PTS (A-PTS). A-PTS allows a non-PTP time source, like GNSS, to be fed into a PTP state machine as a logical PTP port (or virtual PTP port), so that the IEEE-1588 Best Master Clock Algorithm (BMCA) can consider A-PTS as one of candidates, while selecting a grandmaster clock for time synchronization.

BMCA determines which clock in a network has the highest quality and accuracy, so that it can become the grandmaster clock. The grandmaster clock then synchronizes all the other clocks (called slave clocks) in the network. Each clock in the network has a set of attributes that describe its quality, such as class, accuracy, variance, priority, and identity. Each clock periodically sends "announce" packets to broadcast its attributes to the other clocks. Each clock compares its own attributes with the attributes of the other clocks, using a predefined set of rules. The clock with the best attributes is selected as the grandmaster clock. The other clocks become slave clocks and synchronize to the grandmaster clock. If the grandmaster clock fails or loses its quality, BMCA runs again to select a new grandmaster clock from the remaining clocks. BMCA ensures that the network always has a reliable and accurate source of time, and that all the clocks are synchronized to a common reference. BMCA also adapts to changes in the network topology or configuration, such as adding or removing clocks, or switching between different time sources.

FIG. 1A is a block diagram illustrating an exemplary, non-limiting embodiment of precision time protocol nodes in a network in accordance with various aspects described herein. As shown in FIG. 1A, network 100 includes grandmaster clock nodes 101, 102, and IP/MPLS cloud 103, boundary clock nodes 104, 105, an IWF profile 106 for boundary clock node 104, downstream boundary clock nodes 107, 108 and client node 109. In general, PTP-based network clocking is either driven by an FTS architecture under a G.8275.1 standard profile or by a PTS or Assisted PTS (A-PTS) architecture under a G.8275.2 standard profile. For example, as illustrated in FIG. 1A, boundary clock node 105 utilizes an FTS architecture to synchronize with grandmaster clock node 102. In contrast, boundary clock node 104 utilizes an A-PTS architecture through IP/MPLS cloud 103 to synchronize with grandmaster clock node 101.

However, implementing both architectures becomes relatively complicated when mixed using IWFs that translate from one profile to another. For example, boundary clock node 104 implements an IWF profile 106 that translates PTP profile from A-PTS (G.8275.2) to FTS (G.8275.1). From the perspective of boundary clock node 107, both upstream networks appear to be FTS-based, since they are providing clock sources based on an FTS (G.8275.1) profile.

Consider two scenarios. In the first scenario, boundary clock node 104 is locked to GNSS. Boundary clock node 105 is locked to grandmaster node 102 directly, without any hops. In this scenario, boundary clock node 107 can use a standard BMCA (as defined in G.8275.1) to select the best clock source among two available sources. Boundary clock node 104 is not using the PTS-based path in this case, so boundary clock node 104 can be considered similar or even better to boundary clock node 105 as a source, depending on various other factors defined by G.8275.1.

In the second scenario, boundary clock node 104 has lost GNSS and is locked to grandmaster clock node 101 over IP/MPLS cloud 103. Meanwhile, boundary clock node 105 is locked to grandmaster node 102 directly, without any hops. In this scenario, although boundary clock node 104 will still be sending all clock parameters, like clock class, etc., similar to those sent by boundary clock node 105, to boundary clock node 107, it is evident that boundary clock node 105 is a better choice as a clock source, considering the fact that boundary clock node 105 uses an FTS architecture. With everything else being equal, FTS-based clock sources are better because every network hop is timing aware, thus reducing any impact of network packet delay variation (PDV). FTS-based clock sources are usually assisted by a physical frequency source, and thus FTS-based clock sources are more stable. However, the IWF function practically hides details of the clock sources from boundary clock node 107, such as the IWF function recovering a clock from boundary clock node 104 over a PTS network. To counteract this problem, a user can potentially configure boundary clock node 105 as having a higher local priority than boundary clock node 104, but that will mean, even in the first scenario, that boundary clock node 107 would forcibly select boundary clock node 105, which would not be desirable.

Figure 1B:
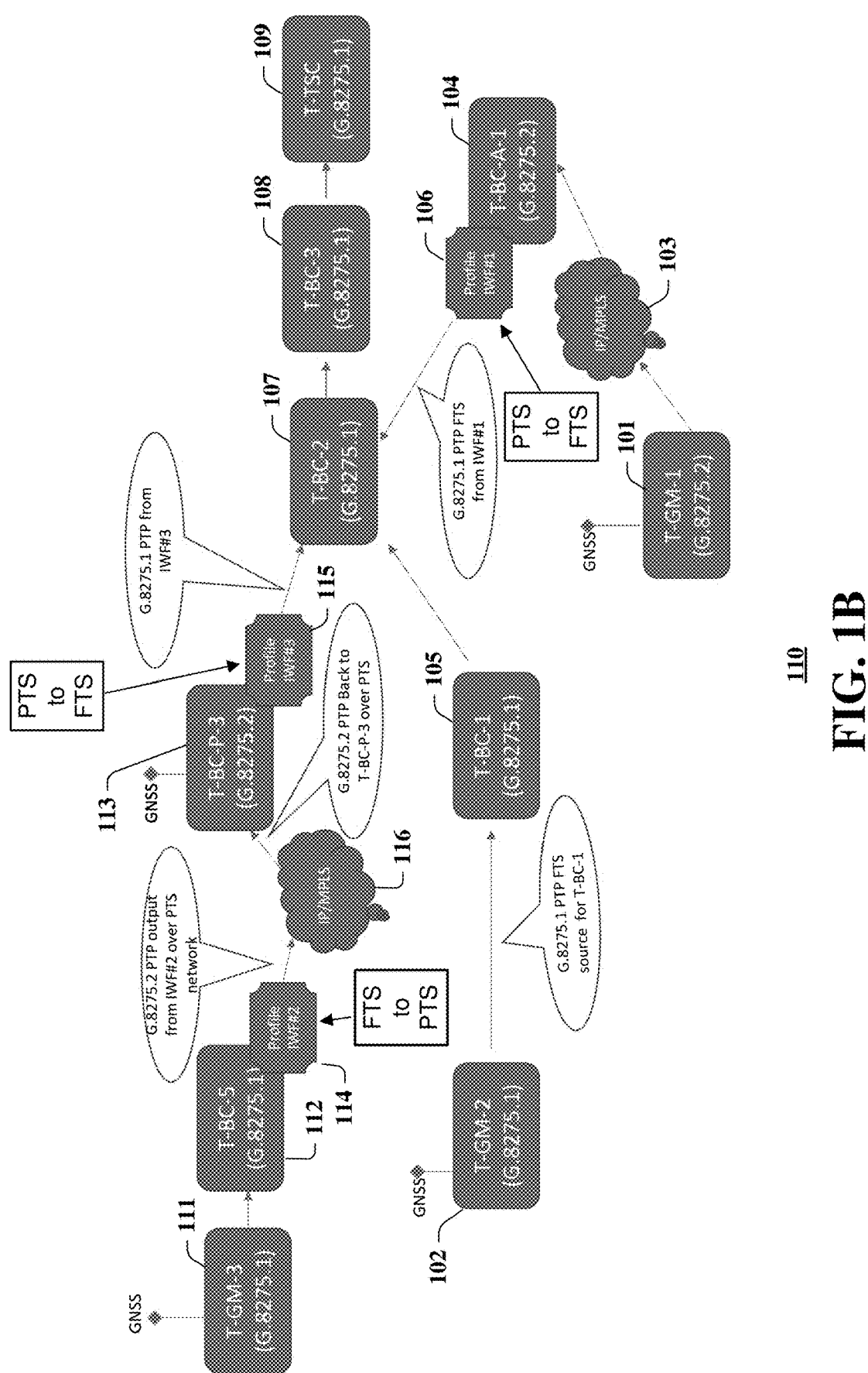
FIG. 1B is a block diagram illustrating an exemplary, non-limiting embodiment of precision time protocol nodes in a network in accordance with various aspects described herein.

FIG. 1B is a block diagram illustrating an exemplary, non-limiting embodiment of precision time protocol nodes in a network in accordance with various aspects described herein. As shown in FIG. 1B, network 110 includes grandmaster clock nodes 101, 102, and IP/MPLS cloud 103, boundary clock nodes 104, 105, an IWF profile 106 for boundary clock node 104, downstream boundary clock nodes 107, 108 and client node 109, as previously illustrated in FIG. 1A, and additionally a third grandmaster clock node 111, boundary clock nodes 112 and 113 and associated IWF profiles 114 and 115, respectively, and a second IP/MPLS cloud 116.

In a third scenario, similar to the second scenario described above, boundary clock node 113 has lost GNSS and is locked to third grandmaster clock node 111 over IP/MPLS cloud 116 through boundary clock node 112 and IWF profile 114. In this third scenario, although boundary clock node 113 will still be sending all clock parameters, like clock class, etc., similar to those sent by boundary clock nodes 104 and 105, to boundary clock node 107, it is evident that boundary clock node 105 or boundary clock node 104 are better choices as clock sources, considering the fact that boundary clock node 113 uses two IWF profiles (FTS to PTS, and then PTS to FTS). What is needed is to provide boundary clock nodes with required information about upstream clock conditions, even in the case of an IWF profile, so that boundary clock nodes can make an informed decision for selection of a clock source.

FIG. 2 is a block diagram illustrating an exemplary, non-limiting embodiment of a table for providing precision time protocol node information in a network in accordance with various aspects described herein. A standard PTP announce packet has a 16-bit field, known as "flags," that is used to convey specific information to PTP clients. In an embodiment, two unused bits ('m' and 'n') in the field can be reserved to indicate the following PTP node information:

Bit 'm': FTS to PTS Translation->Set to 1 if the boundary clock node implements an IWF to convert clock received from FTS network to PTS Bit 'n': PTS to FTS Translation->Set to 1 if the boundary clock node implements an IWF to convert clock received from PTS network to FTS Using bits in a flags field of PTP is one way to send this information, but there can be either more bits or some other fields in PTP protocol which may be used for same invention. As shown in FIG. 2, these bits in table 200 are set whenever a boundary clock node profile translation occurs. In the first scenario where the boundary clock node is locked to a GNSS and thus does not receive clock information from PTP, these flags are not set when sending out an announce packet on master ports of such boundary clock node. Similarly, if a boundary clock node was locked to PTP of different profile thus setting one of these flags and then later the boundary clock node selects GNSS as clock source, the boundary clock node will reset the respective flag. For any boundary clock node that is not doing any IWF profile translation, these flags should be passed along with the same value as received from the selected master clock node.

A PTP client node can use the IWF priority indicated in the last column of table 200 in conjunction with A-BMCA to select the best clock source available. For example, referring to FIG. 1B, boundary clock node 107 may select a clock source from among boundary clock nodes 105, 104 (via IWF profile 106) and 113 (via IWF profile 115), which would supply the 'm' and 'n' bits shown in rows 1, 2 and 3, respectively of table 200. The A-BMCA decision tree has different clock parameters with relative priority for BMCA selection. The "IWF priority" parameter (as described above) can be considered secondary to the received "clock class," which is considered first. The priority level is highest when no interworking function profile translations occur in upstream nodes or the boundary clock node, as shown in the first row of table 200. The priority level is second highest when full timing support is recovered from partial timing support, as shown in the second row of table 200. And the priority level is lowest when partial timing support is recovered from another full timing support, as shown in the last row of table 200. Hence if a boundary clock node receives the same clock class from more than one source, it can select the source from FTS network compared to the PTS source based on "IWF priority," even though the PTS source advertises on the same profile via an IWF.

Figure 3:
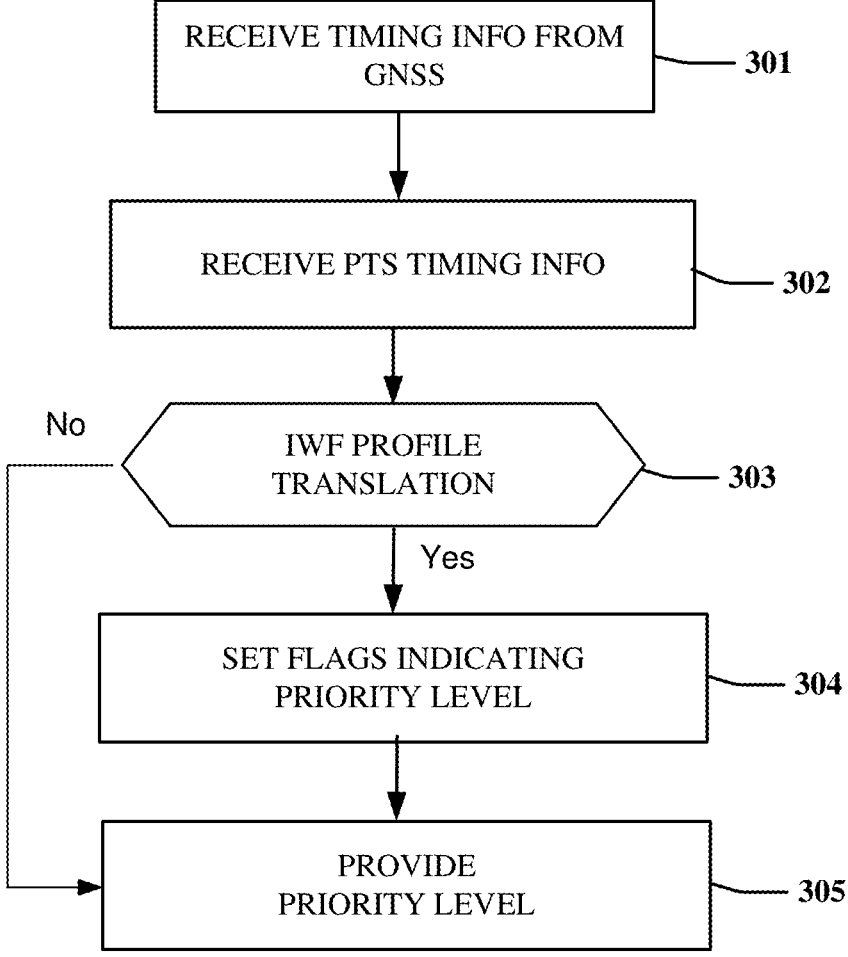
FIG. 3 depicts an illustrative embodiment of a method in accordance with various aspects described herein.

FIG. 3 depicts an illustrative embodiment of a method performed by a node having an IWF profile in accordance with various aspects described herein. As shown in FIG. 3, method 300 begins at step 301, where a node receives first timing information from a global navigation satellite system receiver. Next at step 302, the node receives second timing information by partial timing support via a network. Then at step 303, the node determines whether any interworking function (IWF) profile translation occurs. Such IWF translation may be from PTS to FTS for delivery of timing information to a downstream node. Note that IWF translation would not be considered if timing info from a GNSS receiver is used and not from PTS/PTP. If no translation occurs, i.e., no flags are set, then the process continues at step 305. But if such IWF translation occurs, then at step 304, the node sets flags in a PTP announce message indicating the priority level based on the IWF translations, if any. Finally in step 305, the node provides the priority level in the PTP announce message.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
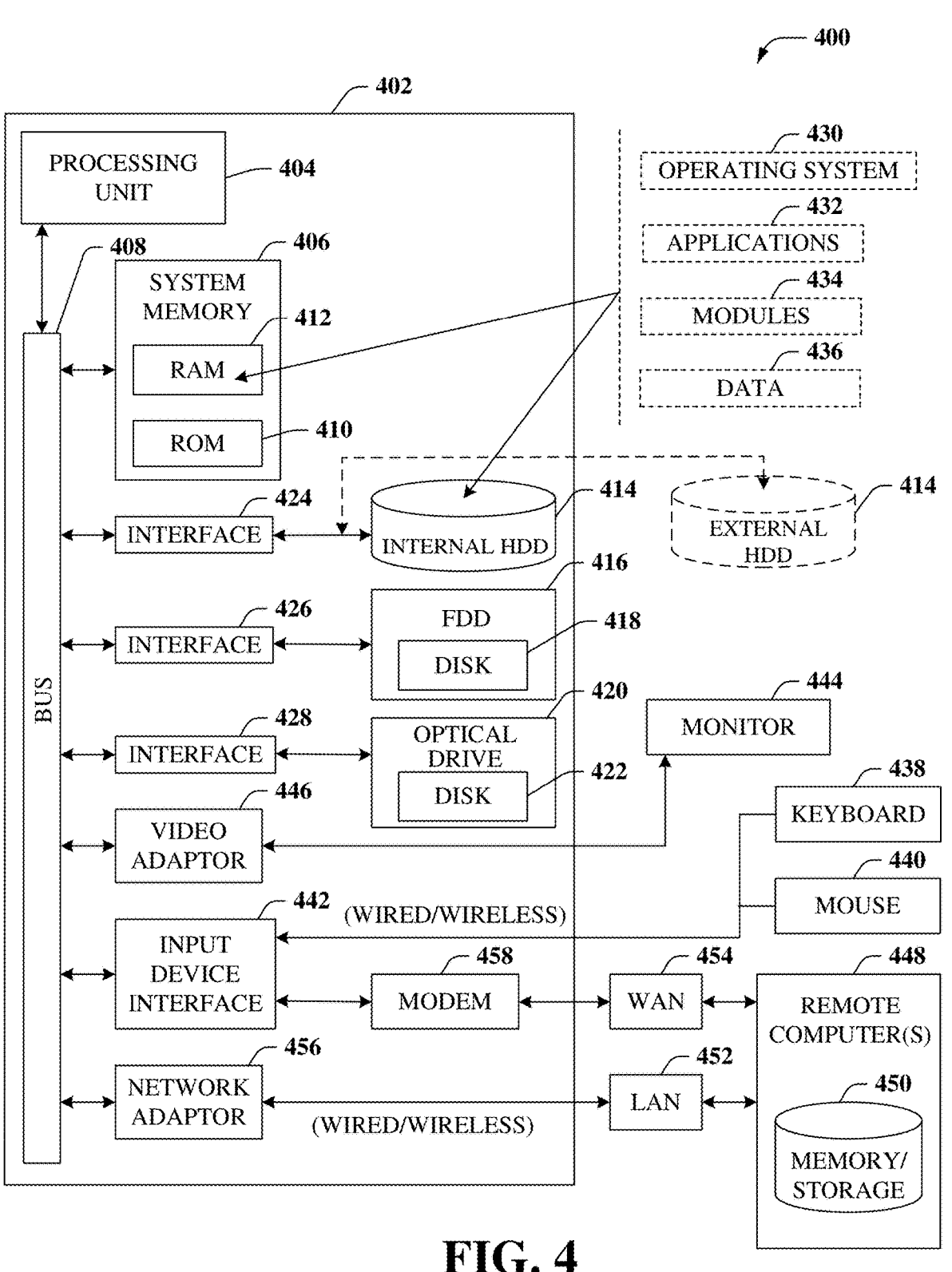
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a computing environment 400, when combined with specific equipment such as a GNSS receiver, a timing subsystem including PLL, etc., a forwarding switch/ASIC for Ethernet or IP/MPLS processing capability to support PTP, etc., that would be suitable for implementing the various embodiments of the subject disclosure. For example, computing environment 400 can facilitate in whole or in part receiving timing information via partial timing support over an Internet Protocol network; and providing an indication of a priority level of an interworking function in an announce packet of precision timing protocol to a downstream node.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. System memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen and the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. Modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving an indication of a priority level of an interworking function used by a boundary clock node; and
selecting a best master clock using an algorithm that considers the priority level of the interworking function.

2. The device of claim 1, wherein the indication is received in an announce packet of precision timing protocol sent from a master port of the boundary clock node.

3. The device of claim 1, wherein the priority level is considered secondary to a received clock class.

4. The device of claim 3, wherein the priority level is highest when no interworking function profile translations occur in the boundary clock node.

5. The device of claim 4, wherein the priority level is second highest when full timing support is recovered from partial timing support.

6. The device of claim 5, wherein the priority level is lowest when the partial timing support is recovered from another full timing support.

7. A device, comprising:
a processing system including a processor;
a clock; and
a memory that stores executable instructions that, when executed by the processing system, facilitate performance of operations, the operations comprising:
receiving first timing information from a time source;
receiving second timing information via partial timing support over an Internet Protocol network; and
providing an indication of a priority level of an interworking function in an announce packet of precision timing protocol to a downstream node.

8. The device of claim 7, wherein the indication is identical to a second indication received from an upstream node if no interworking function profile translation occurs.

9. The device of claim 7, wherein the priority level is highest when the clock is locked to the first timing information.

10. The device of claim 7, wherein the priority level is highest when no interworking function profile translations occur.

11. The device of claim 10, wherein the priority level is second highest when full timing support is recovered from the partial timing support.

12. The device of claim 11, wherein the priority level is lowest when the partial timing support is recovered from another full timing support.

13. The device of claim 7, wherein the indication is conveyed in flags of the announce packet.

14. A non-transitory, machine-readable medium, comprising executable instructions that, when executed by a processing system including a processor, facilitate performance of operations, the operations comprising:

receiving first timing information from a time source;

receiving second timing information via partial timing support over a multiprotocol label switching network; and providing an indication of a priority level of an interworking function in an announce packet of precision timing protocol to a downstream node.

15. The non-transitory, machine-readable medium of claim 14, wherein the operations further comprise selecting a best master clock using an algorithm that considers a second priority level received from an upstream node.

16. The non-transitory, machine-readable medium of claim 15, wherein the indication corresponds to the second priority level if no interworking function profile translation occurs.

17. The non-transitory, machine-readable medium of claim 14, wherein the priority level is highest when synchronized to the first timing information.

18. The non-transitory, machine-readable medium of claim 17, wherein the priority level is second highest when full timing support is recovered from the partial timing support.

19. The non-transitory, machine-readable medium of claim 18, wherein the priority level is lowest when the partial timing support is recovered from another full timing support.

20. The non-transitory, machine-readable medium of claim 14, wherein the indication is conveyed in flags of the announce packet.

* * * * *